(12) United States Patent
Mandal et al.

(10) Patent No.: US 11,200,885 B1
(45) Date of Patent: Dec. 14, 2021

(54) GOAL-ORIENTED DIALOG SYSTEM

(71) Applicant: Amazon Technologies, Inc., Seattle, WA (US)

(72) Inventors: Arindam Mandal, Redwood City, CA (US); Nikko Strom, Kirkland, WA (US); Angeliki Metallinou, Mountain View, CA (US); Tagyoung Chung, Sunnyvale, CA (US); Dilek Hakkani-Tur, Los Altos, CA (US); Suranjit Adhikari, San Jose, CA (US); Sridhar Yadav Manoharan, Cupertino, CA (US); Ankita De, San Jose, CA (US); Qing Liu, Sunnyvale, CA (US); Raefer Christopher Gabriel, San Jose, CA (US); Rohit Prasad, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 16/219,228

(22) Filed: Dec. 13, 2018

(51) Int. Cl.
*G10L 15/22* (2006.01)
*G10L 21/00* (2013.01)
*G10L 15/06* (2013.01)
*G10L 15/18* (2013.01)
*G06F 16/332* (2019.01)

(52) U.S. Cl.
CPC ........ *G10L 15/063* (2013.01); *G06F 16/3329* (2019.01); *G10L 15/1815* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,533,019 B1* | 5/2009 | Hakkani-Tur | G10L 15/065 704/252 |
| 7,912,720 B1* | 3/2011 | Hakkani-Tur | G06F 40/253 704/270 |
| 2006/0149555 A1* | 7/2006 | Fabbrizio | G10L 15/22 704/275 |
| 2006/0206332 A1* | 9/2006 | Paek | G10L 13/00 704/257 |
| 2009/0119104 A1* | 5/2009 | Weng | H04M 3/10 704/244 |
| 2010/0088097 A1* | 4/2010 | Tian | G10L 15/07 704/251 |

(Continued)

OTHER PUBLICATIONS

Shah, Pararth, et al. "Building a conversational agent overnight with dialogue self-play." arXiv preprint arXiv:1801.04871. (Year: 2018).*

*Primary Examiner* — Seong-Ah A Shin
(74) *Attorney, Agent, or Firm* — Pierce Atwood LLP

(57) ABSTRACT

A dialog manager receives text data corresponding to a dialog with a user. Entities represented in the text data are identified. Context data relating to the dialog is maintained, which may include prior dialog, prior API calls, user profile information, or other data. Using the text data and the context data, an N-best list of one or more dialog models is selected to process the text data. After processing the text data, the outputs of the N-best models are ranked and a top-scoring output is selected. The top-scoring output may be an API call and/or an audio prompt.

20 Claims, 15 Drawing Sheets

(56) References Cited

U.S. PATENT DOCUMENTS

| | | | | |
|---|---|---|---|---|
| 2012/0016678 | A1* | 1/2012 | Gruber | G06F 9/54 |
| | | | | 704/275 |
| 2014/0214425 | A1* | 7/2014 | Bak | G10L 15/08 |
| | | | | 704/249 |
| 2014/0278413 | A1* | 9/2014 | Pitschel | G10L 15/22 |
| | | | | 704/243 |
| 2014/0310002 | A1* | 10/2014 | Nitz | G10L 15/22 |
| | | | | 704/270.1 |
| 2014/0316764 | A1* | 10/2014 | Ayan | G10L 15/22 |
| | | | | 704/9 |
| 2015/0348551 | A1* | 12/2015 | Gruber | H04M 3/4936 |
| | | | | 704/235 |
| 2016/0104478 | A1* | 4/2016 | Seo | G10L 15/08 |
| | | | | 704/244 |
| 2017/0357478 | A1* | 12/2017 | Piersol | G10L 15/30 |
| 2018/0226076 | A1* | 8/2018 | Kotti | G10L 15/02 |
| 2019/0180770 | A1* | 6/2019 | Kothari | G10L 25/03 |
| 2020/0152184 | A1* | 5/2020 | Steedman Henderson | |
| | | | | G06N 3/084 |

* cited by examiner

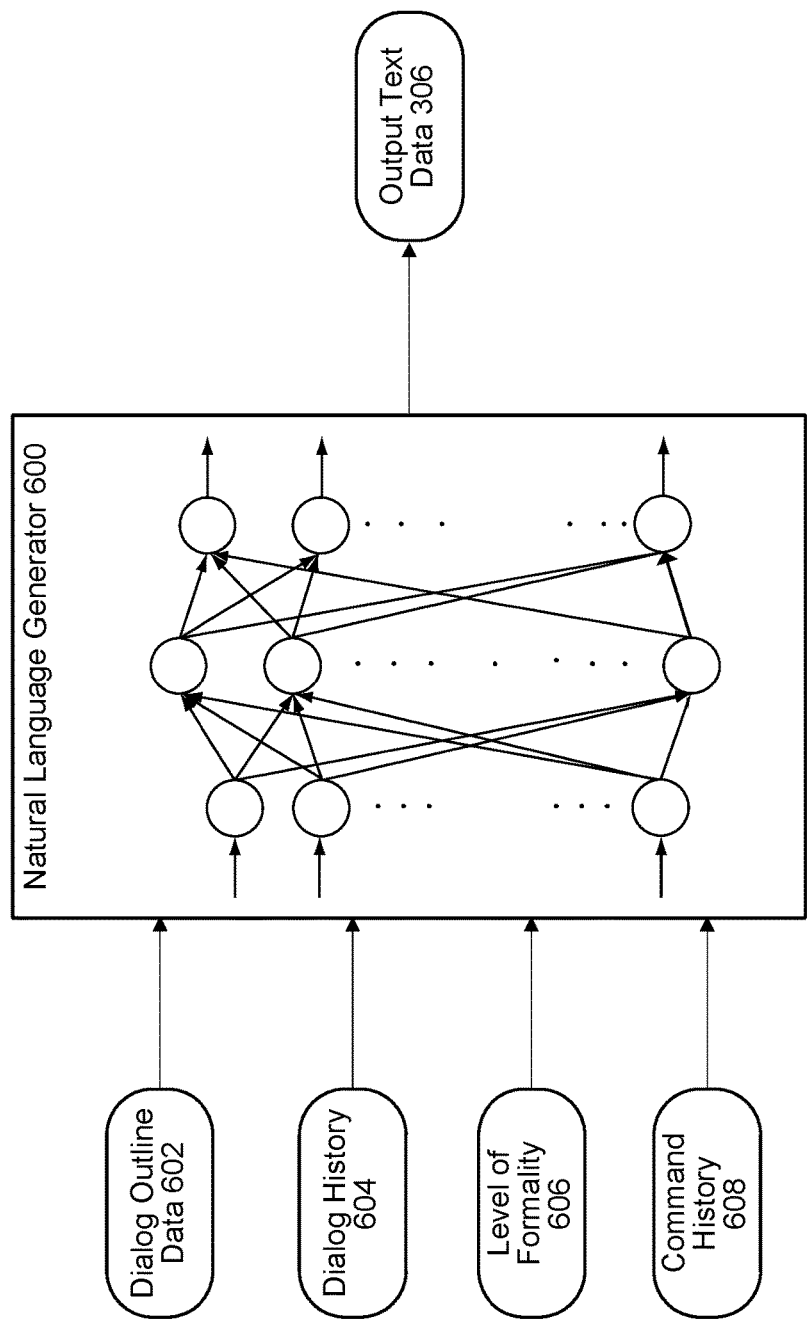

GOAL-ORIENTED DIALOG SYSTEM

BACKGROUND

Speech-recognition systems have progressed to a point at which human users are able to control computing devices using their voices. These systems employ techniques to identify words spoken by the user based on the various qualities of a received audio input. Speech-recognition processing combined with natural-language understanding processing enables voice-based control of a computing device to perform tasks based on the user's spoken commands. The combination of speech-recognition processing and natural-language understanding processing is referred to herein as speech processing. Speech processing may also involve converting a user's speech into text data, which may then be provided to other applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 a system for generating natural language according to embodiments of the present disclosure;

DETAILED DESCRIPTION

Figure 1:
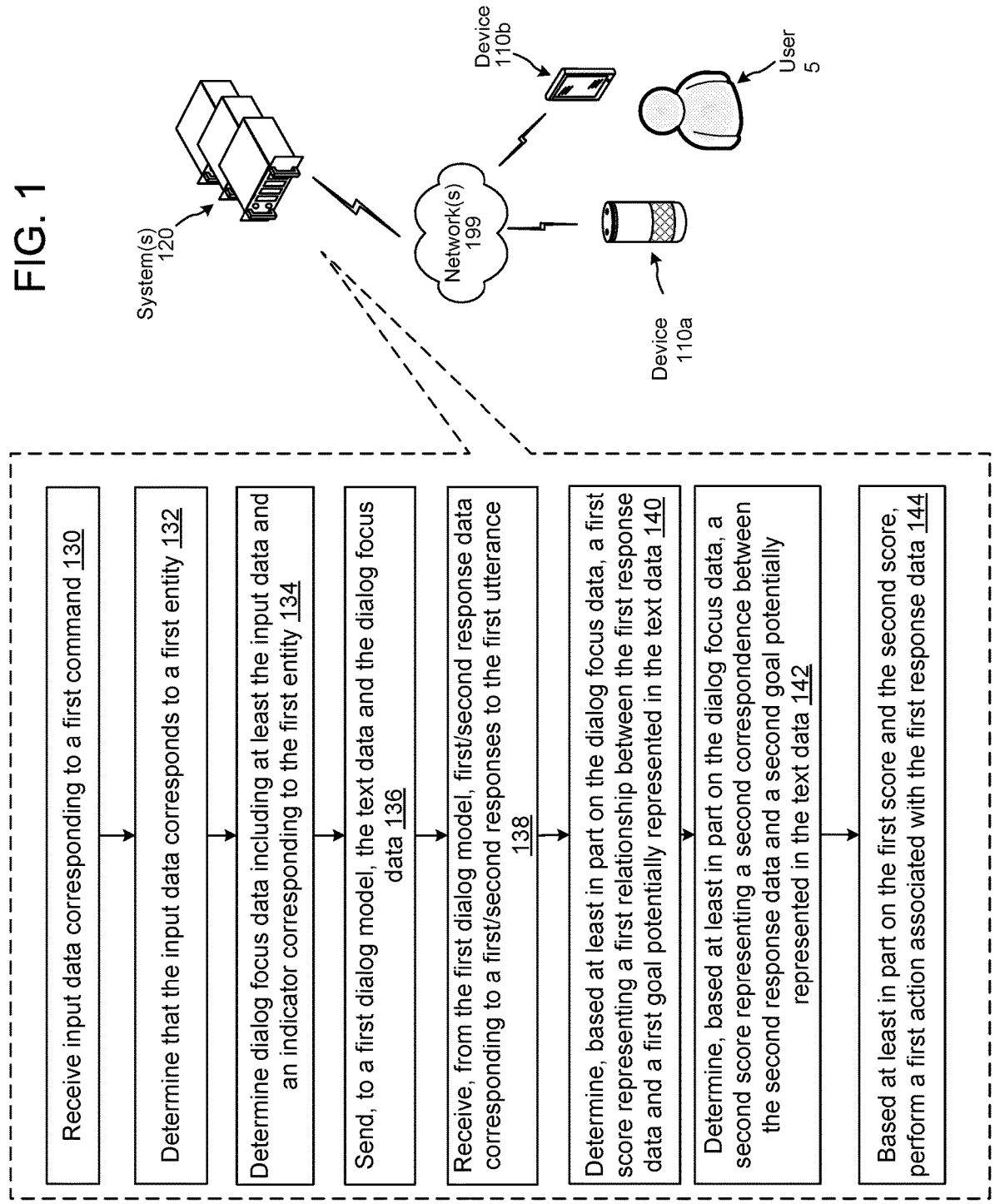
FIG. 1 illustrates a flow diagram for generating goal-oriented dialog according to embodiments of the present disclosure.

Dialog processing, as used herein, is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user. In some goal-oriented dialog sessions, however, the system selects a particular application to act on an expressed goal, but the user may express (or the system may determine) a second goal that cannot be acted upon using the selected application.

In one example interaction with a dialog system, shown below in Table 1, a user interacts with the dialog system. The user expresses a desire to take a spouse out for their anniversary. Though the system identifies an event in a specified area, the system did not understand that the user wished for an appropriately romantic event, and instead suggested an action movie. The user then asks for a restaurant; the system did not understand that the user wished the same location and, further, did not understand the romantic intent and suggests fast food-restaurants.

TABLE 1

Sample Dialog

| Turn Number | User Input | System Output |
| --- | --- | --- |
| 1 | "Hi." | "Hello, what can I help you with today?" |
| 2 | "Where should I take my wife tonight? It's our anniversary." | "What is your ZIP code?" |
| 3 | "12345" | [API: movies] "There is a cinema there showing two action movies; one at 9 PM and one at 10 PM. Which one would you like to go to?" |
| 4 | "No, thank you. How about a restaurant?" | "Near where" |
| 5 | "12345" | [API: food] "There are two fast-food restaurants there. Which one would you like?" |
| 6 | "No, thanks." | |

Described herein is a system and method for dialog management that collects and retains context data relevant to a dialog—i.e., prior dialog, prior actions, user preferences, user location, and/or time of day—predicts which of a plurality of dialog models may be relevant to a next turn of dialog, and evaluates the output of the models to select a most relevant action. The system may thus select a different dialog model—and corresponding action—for each turn of dialog, thereby responding accurately to each goal expressed by a user, even if the goals are different, without requiring the user to repeat previously stated information. The system may further anticipate goals not yet stated by the user and output data offering the goals.

In an example interaction with the dialog system, shown below in Table 2, the system understands and responds to different goals of the user. The system understands that the user wishes a romantic event and searches for one. The system suggest an appropriate restaurant and further asks about transportation.

TABLE 2

Sample Dialog

| Turn Number | User Input | System Output |
|---|---|---|
| 1 | "Hi." | "Hello, what can I help you with today?" |
| 2 | "Where should I take my wife tonight? It's our anniversary." | "What is your ZIP code?" |
| 3 | "12345" | [API:movies, food] "There are no suitable movies showing near there. How about dinner at a romantic restaurant?" |
| 4 | "Yes." | [API:food] "There is a bistro there with an opening at 7." |
| 5 | "OK." | [API:transit] "Would you also like to call a taxi?" |
| 6 | "No, thanks." | |

FIG. 1 shows a system 120 configured to perform dialog processing according to embodiments of the disclosure. Although FIG. 1 (and other figures and discussion herein) illustrate the operation of the system in a particular configuration and order, the steps described herein may be performed in a different order (and certain steps may be removed or added) without departing from the intent of the disclosure. Although the system 120 is depicted in FIG. 1 as a single element, the system 120 may be one or more devices.

The system 100 may further include additional elements. Devices 110a/110b may communicate with the system 120 via a network 199. The devices 110a/110b may be, for example, a computer, smartphone, tablet, network-connected loudspeaker, automobile, home appliance, or any other device. The system 120 may communicate with the devices 110a/110b using a text-entry device, such as a keyboard or touchscreen, using an audio-capture device, such as a microphone, using an image-capture device, such as a camera or video camera, or any other such communication device or system. The devices 110a/110b may include an output device, such as a screen, touchscreen, loudspeaker, haptic-feedback device, etc., for relaying communications from the system 120. The network 199 may include the Internet and/or any other wide- or local-area network, and may include wired, wireless, and/or cellular network hardware.

In various embodiments, the system 120 receives (130) input data corresponding to a first command and determines (132) that the input data corresponds to a first entity (e.g., a person, place, or thing). The input data may be text data, audio data, gesture data, and/or other data. The system determines (134) dialog focus data including at least the input data and an indicator corresponding to the first entity; as explained further below, the dialog focus data may include dialog history data, API call data, and/or user preference data. The system sends (136), to a first dialog model, the text data and the dialog focus data. The system receives (138), from the first dialog model, first and second response data corresponding to first and second responses to the first utterance and determines 140 a first score representing a first relationship between the first response data and a first goal potentially represented in the text data and determines (142) a second score representing a second relationship between the second response data and a second goal potentially represented in the text data. Based at least in part on determining the first score and the second score, the system performs (144) an action associated with the first response data. As also explained further herein, second response data corresponding to the first utterance may be determined by a third dialog model, and the system may select the first response data after comparing and scoring the first and third response data.

Figure 2:
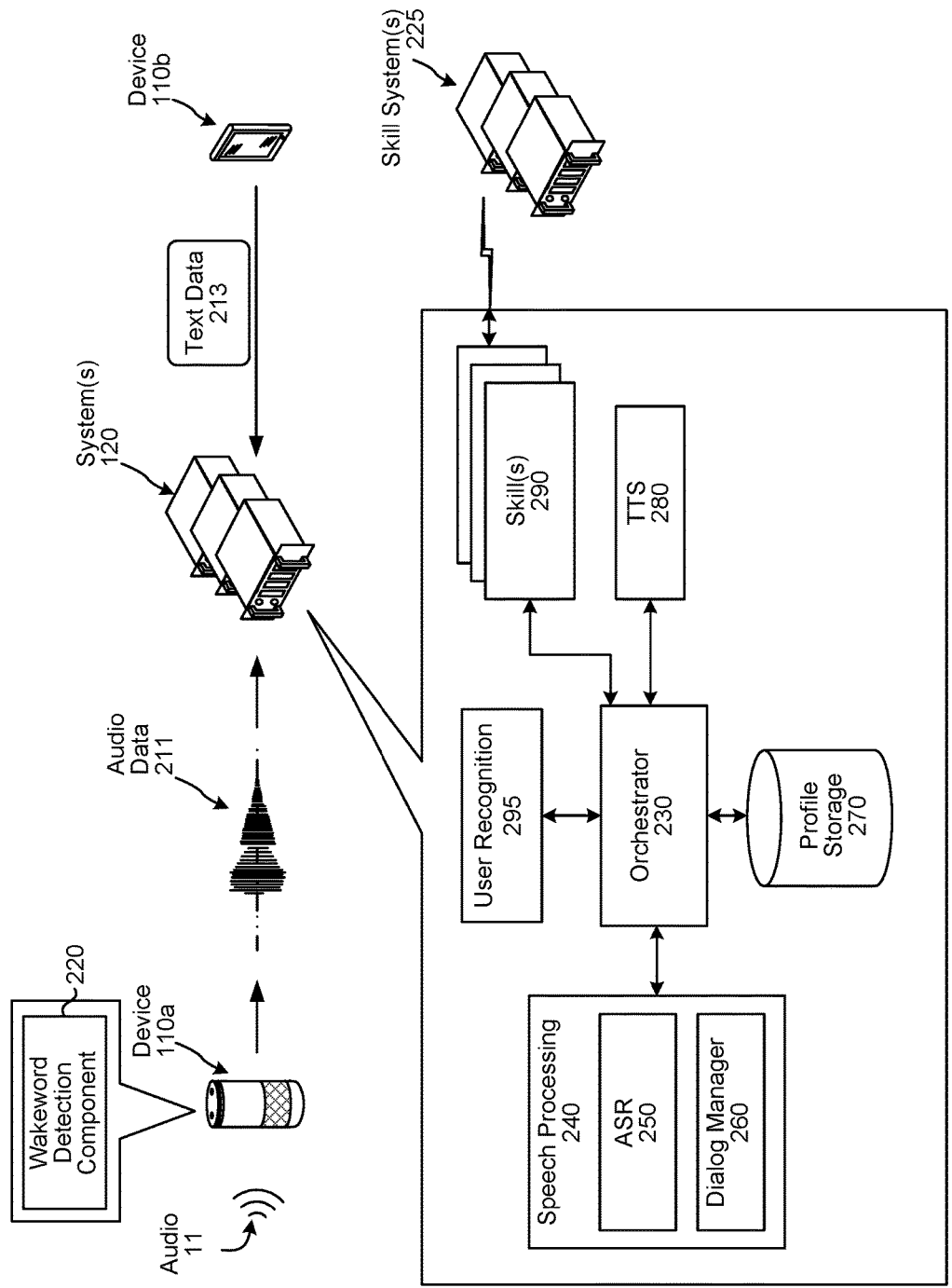
FIG. 2 is a conceptual diagram of speech processing components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of a device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110a. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the system(s) 120. The audio data 211 may include data corresponding to the wakeword, or the portion of the audio corresponding to the wakeword may be removed by the device 110a prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The system(s) 120 may include a dialog manager component 260 that manages and/or tracks a dialog between a user and a device. The dialog manager component 260 may associate a dialog session identifier with the dialog upon identifying that the user is engaging in a dialog with the user. The dialog manager component 260 may track a user input and the corresponding system generated response to the user input as a turn. The dialog session identifier may correspond to multiple turns of user input and corresponding system generated response. The dialog manager component 260 may transmit data identified by the dialog session identifier directly to the orchestrator component 230 or other component. Depending on system configuration the dialog manager 260 may determine the appropriate system generated response to give to a particular utterance or user input of a turn. Or creation of the system generated response may be managed by another component of the system (e.g., the orchestrator 230) while the dialog manager 260 selects the appropriate responses. Alternatively, another component of the system(s) 120 may select responses using techniques discussed herein. The text of a system generated response may be sent to a TTS component 280 for creation of audio data corresponding to the response. The audio data may then be sent to a user device (e.g., device 110a) for ultimate output to the user. Alternatively (or in addition) a dialog response may be returned in text or some other form.

The dialog manager 260 may receive the ASR hypothesis/ hypotheses (i.e., text data) and make a semantic interpretation of the phrase(s) or statement(s) represented therein. That is, the dialog manager 260 determines one or more meanings associated with the phrase(s) or statement(s) represented in the text data based on words represented in the text data. The dialog manager 260 determines a goal corresponding to an action that a user desires be performed as well as pieces of the text data that allow a device (e.g., the device 110, a the system(s) 120, a skill 290, a skill system(s) 225, etc.) to execute the intent. If, for example, the text data corresponds to "what is the weather," the dialog manager 260 may determine that that the system(s) 120 is to output weather information associated with a geographic location of the device 110a. In another example, if the text data corresponds to "turn off the lights," the dialog manager 260 may determine that the system(s) 120 is to turn off lights associated with the device(s) 110a or the user(s) 5.

The dialog manager 260 may send the results data to one or more skill(s) 290. If the results data includes a single hypothesis, the orchestrator component 230 may send the results data to the skill(s) 290 associated with the hypothesis. If the results data includes an N-best list of hypotheses, the orchestrator component 230 may send the top scoring hypothesis to a skill(s) 290 associated with the top scoring hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather system skill may enable the system(s) 120 to provide weather information, a car system skill may enable the system(s) 120 to book a trip with respect to a taxi or ride sharing system, a restaurant skill may enable the system(s) 120 to order a pizza with respect to the restaurant's online ordering system, etc. A skill 290 may operate in conjunction between the system(s) 120 and other devices, such as the device 110a, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder. In another method of synthesis, a model is trained to directly generate audio data samples corresponding to output speech based on received text data.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information. The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
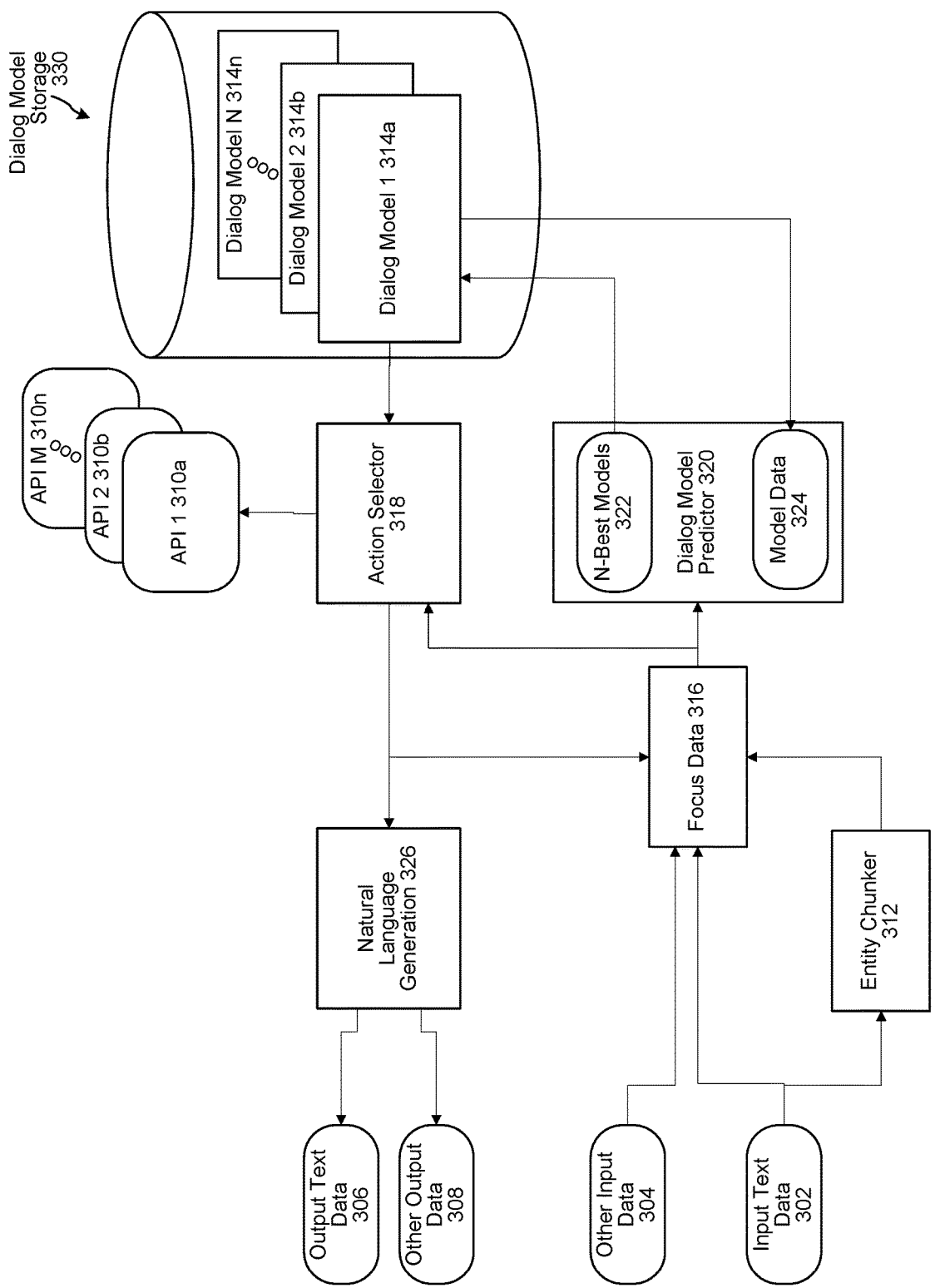
FIG. 3 a system for managing goal-oriented dialog using multiple dialog models according to embodiments of the present disclosure.

FIG. 3 is an illustrative diagram of a dialog system according to embodiments of the present disclosure. The system receives input text data 302; the input text data 302 may include text corresponding to a user input and metadata indicating further information about the text (such as an identity of the user, an emotional state of the user, etc.). The input text data 302 may be text representing words, instructions, markup language, speech, or gestures, or may be a vector or other representation of the same. The input text data 302 may be generated by a user via a keyboard, touchscreen, microphone, camera, or other such input device. In other embodiments, the input text data 302 is created using ASR, as described above, from audio data received from a user. The system may further receive other input data 304, which may correspond to a button press, gesture, or other input. As described in greater detail below, using the input text data 302 and/or other input data 304, the system may determine and output text data 306 and/or other output data 308. The system may instead or in addition perform an action based on the input text data 302 and/or other input data 304, such as calling one or more APIs 310.

An entity chunker 312 may be used to determine that the input text data 302 includes a representation of one or more entities, a process that may include named entity recognition (NER)—i.e., determining that the input text data 302 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names.

In some embodiments, a single entity chunker 312 is used for more than one domain (i.e., a "cross-domain" entity chunker 312). Each domain may correspond to one or more dialog models 314 (which are described in greater detail below). In other embodiments, a plurality of entity chunkers 312 each correspond to a subset of the dialog models 314 (i.e., "single-domain" entity chunkers 312). One or more candidate domains corresponding to the input text data 312 may be determined; entity chunkers 312 corresponding to the candidate domains may be used to process the input text data 312. The dialog focus data 316 may store the output entities from each candidate domain and may remove unselected entities when dialog model 314 is selected.

The dialog focus data 316 may store state data corresponding to dialog history data, action history data, and/or other data. In some embodiments, the other components (e.g., the action selector 318 and/or the inference engine 402 of FIG. 4) do not store state data and instead query the dialog focus data 316 for the state data. The system may send some or all of the dialog focus data 316 to other systems and/or may receive additional dialog focus data from other systems. In some embodiments, the other components (e.g., the action selector 318 and/or the inference engine 402 of FIG. 4)

include a feature-extractor component to extract features from the dialog focus data 316.

The dialog focus data 316 may be graph-based data including a plurality of graph nodes; each graph node may correspond to an item of state data, such as an entity type, entity value, prior API call, and/or user data. The other components, such as the action selector 318, may access all of the graph nodes of the dialog focus data 316 or may access only a subset of the graph nodes of the dialog focus data 316. The dialog focus data 316 may be any type of storage mechanism and may serve as long-term and/or short term memory for the system, thus enabling tracking of entities, ASR output, TTS output, and other features) at each turn through a dialog. In some embodiments, the dialog focus data 316 is updated after each turn of dialog with updated dialog focus data; in other embodiments, the dialog focus data 316 is updated after an end of a dialog is determined.

The entity chunker 312 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 290 (e.g., a shopping skill, a music skill, a video skill, etc.), or may be organized in a variety of other ways.

For example, the entity chunker 312 may parse the input text data 302 to identify words as subject, object, verb, preposition, etc. based on grammar rules and/or models prior to recognizing named entities in the text data. The entity chunker 312 may perform semantic tagging, which is the labeling of a word or combination of words according to their type/semantic meaning. The entity chunker 312 may parse text data using heuristic grammar rules, or a model may be constructed using techniques such as Hidden Markov Models, maximum entropy models, log linear models, conditional random fields (CRF), and the like. For example, an entity chunker 312 implemented by a music skill recognizer may parse and tag text data corresponding to "play mother's little helper by the rolling stones" as {Verb}: "Play," {Object}: "mother's little helper," {Object Preposition}: "by," and {Object Modifier}: "the rolling stones." The entity chunker 312 identifies "Play" as a verb based on a word database associated with the music skill and may determine that the verb corresponds to a <PlayMusic> intent.

The entity chunker 312 may tag text data to attribute meaning thereto. For example, the entity chunker 312 may tag "play mother's little helper by the rolling stones" as: {skill} Music, {intent} <PlayMusic>, {artist name} rolling stones, {media type} SONG, and {song title} mother's little helper. For further example, the entity chunker 312 may tag "play songs by the rolling stones" as: {skill} Music, {intent} <PlayMusic>, {artist name} rolling stones, and {media type} SONG.

The entity chunker 312 may apply rules or other instructions to transform labels or tokens into a standard representation. The transformation may depend on the skill 290. For example, for a travel skill, the entity chunker 312 may transform text data corresponding to "Boston airport" to the standard BOS three-letter code referring to the airport. The entity chunker 312 can refer to an entity storage(s) (including text data representing entities known to the system) to resolve the precise entity referred to in each slot of each NLU hypothesis represented in the cross-skill N-best list data. Specific intent/slot combinations may also be tied to a particular source, which may then be used to resolve the text data. In the example "play songs by the stones," the entity chunker 312 238 may reference a personal music catalog, Amazon Music account, user profile data, or the like. The entity chunker 312 may output text data including an altered N-best list that is based on the cross-skill N-best list data, and that includes more detailed information (e.g., entity IDs) about the specific entities mentioned in the slots and/or more detailed slot data that can eventually be used by a skill 290. The entity chunker 312 may include multiple entity resolution components and each entity resolution component may be associated with one or more particular skills 290.

The entity chunker 312 may use frameworks linked to the intent to determine what database fields should be searched to determine the meaning of tagged entities, such as searching a user's gazetteer for similarity with the framework slots. For example, a framework for a <PlayMusic> intent might indicate to attempt to resolve an identified object based on {Artist Name}, {Album Name}, and {Song name}, and another framework for the same intent might indicate to attempt to resolve an object modifier based on {Artist Name}, and resolve the object based on {Album Name} and {Song Name} linked to an identified {Artist Name}. If the search of the gazetteer does not resolve a slot/field using gazetteer information, the entity chunker 312 may search a database of generic words associated with the skill 290. For example, if the text data includes "play songs by the rolling stones," after failing to determine an album name or song name called "songs" by "the rolling stones," the entity chunker 312 may search the skill vocabulary for the word "songs." In the alternative, generic words may be checked before the gazetteer information, or both may be tried, potentially producing two different results.

The entity chunker 312 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity chunker 312.

Figure 11:
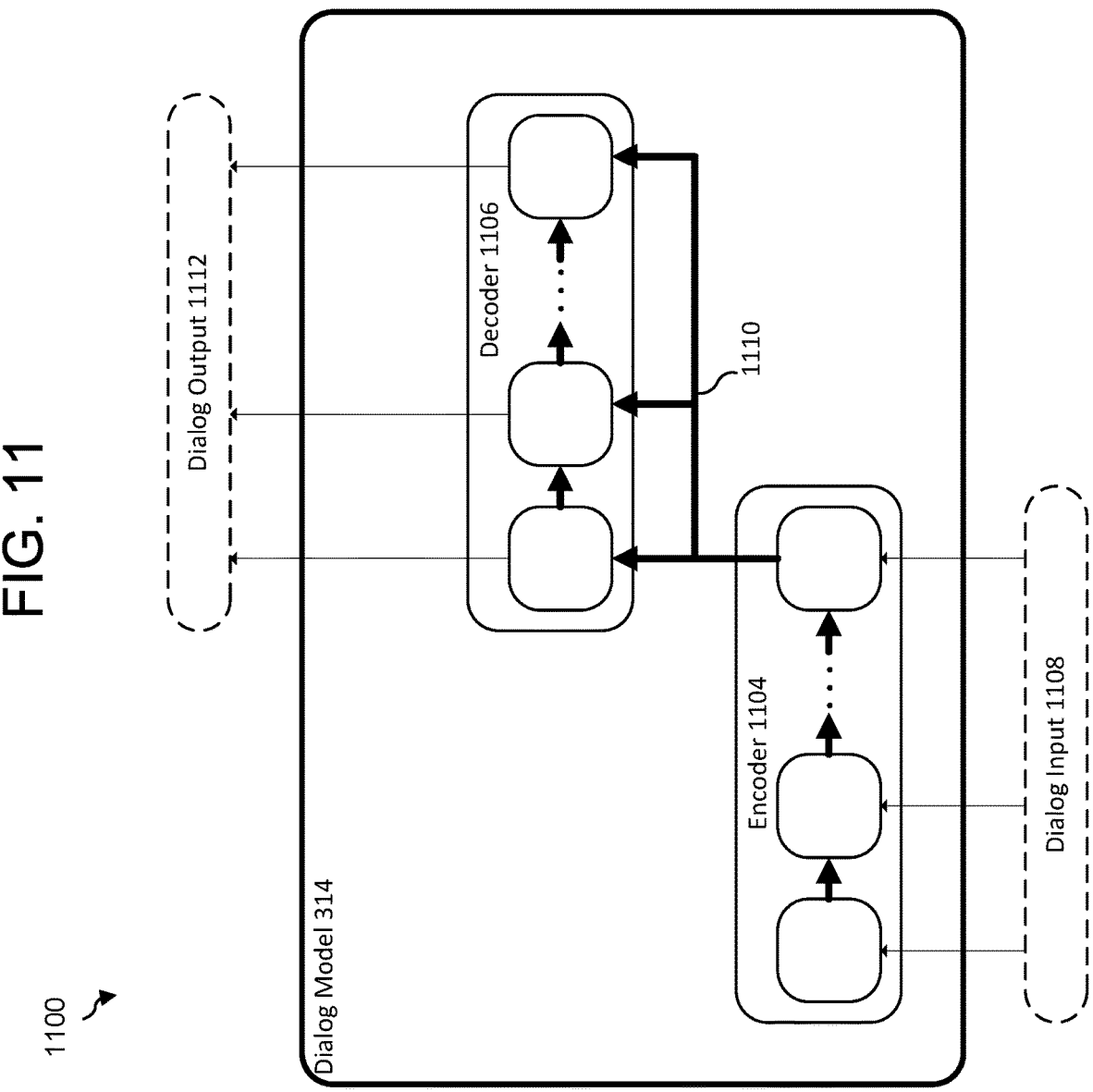
FIG. 11 illustrates a translation/language model for dialog processing according to embodiments of the present disclosure.

Dialog focus data 316 may store data relevant to a dialog. In various embodiments, the dialog focus data 316 stores the input text data 302, other input data 304, entity data from the entity chunker 312 and/or action data and dialog data from an action selector 318 (described in greater detail below). The dialog focus data 316 may further include additional information, such as location data, user preference data, and environment data. In various embodiments, the dialog focus data 316 uses an encoder to encode some or all of the received data into one or more feature vectors and a decoder to determine, based on the feature vectors, intent data corresponding to an intent of a user. The dialog focus data 316 may further include state data that represents prior dialog, actions, or other prior user information or data. FIG. 11, explained in greater detail below, includes examples of an encoder 1104, feature vector 1110, and decoder 1106.

The dialog focus data 316 may be used by a dialog model predictor 320 to select one or more dialog models 314 in dialog model storage 330 for further processing of the input text data 302. Each dialog model may be associated with one or more categories of functions. The dialog model predictor 320 may be a trained model, such as a classifier. In various embodiments, the dialog model predictor 320 generates an N-best list 322 of the dialog models 314 for further processing. The dialog model predictor 320 may create the N-best list by determining a score for each dialog model 314 given the dialog focus data 316 and model data 324. The model data 324 may include a type of each dialog model 314 and APIs and corresponding entities for each dialog model 314. The dialog model predictor may, for example, determine the score based on presence or absence of one or more entities determined by the entity chunker 312 in the model data 324; presence of an entity in a list of entities corresponding to a dialog model 314 may, for example, indicate a higher score. The dialog model predictor 320 may thus send the input text data 302 to the models 314 having the N highest scores; in other embodiments, the dialog model predictor 320 sends the input text data 302 to the models 314 having scores greater than a threshold. The threshold may be a numerical value or the number N of models 314 to be selected.

The selected dialog model(s) 314 may process the input text data 302; in some embodiments, the dialog model(s) 314 also receive the other input data 304 and/or dialog focus data 316. Each dialog model 314 may be a trained model, such as a sequence-to-sequence model (an example of which appears in FIG. 11), and may be trained using goal-oriented dialog training data. The training data may include dialog between a user and a system and may include API call information related to goals expressed by the user.

Each of the selected dialog models 314 generates response data based on the input text data 302. The response data may include output text data, which may correspond to a prompt for more information (e.g., additional entity information). The response data may further include API call data and corresponding entities.

The action selector 318 selects at least one of the outputs of the dialog model(s) 314 for further processing. Each output may be associated with a corresponding category of function(s). The action selector 318 may be a trained model, such as a classifier, and may determine a score for each of the outputs of the dialog models 314 based on each's similarity or relevance to the dialog focus data 316, based on user preference data, and/or based on the input text data 302. The output of the dialog model 314 corresponding to the highest score is selected; if the output is an API call, one or more APIs 310 may be activated and a corresponding action carried out. If, however, the output is a prompt or other output data, a natural language generator 326 may be used to generate the output text data 306 and/or other output data 308 based on the output of the dial model 314. In either case, the action may be used to update the dialog focus data 316.

Figure 4:
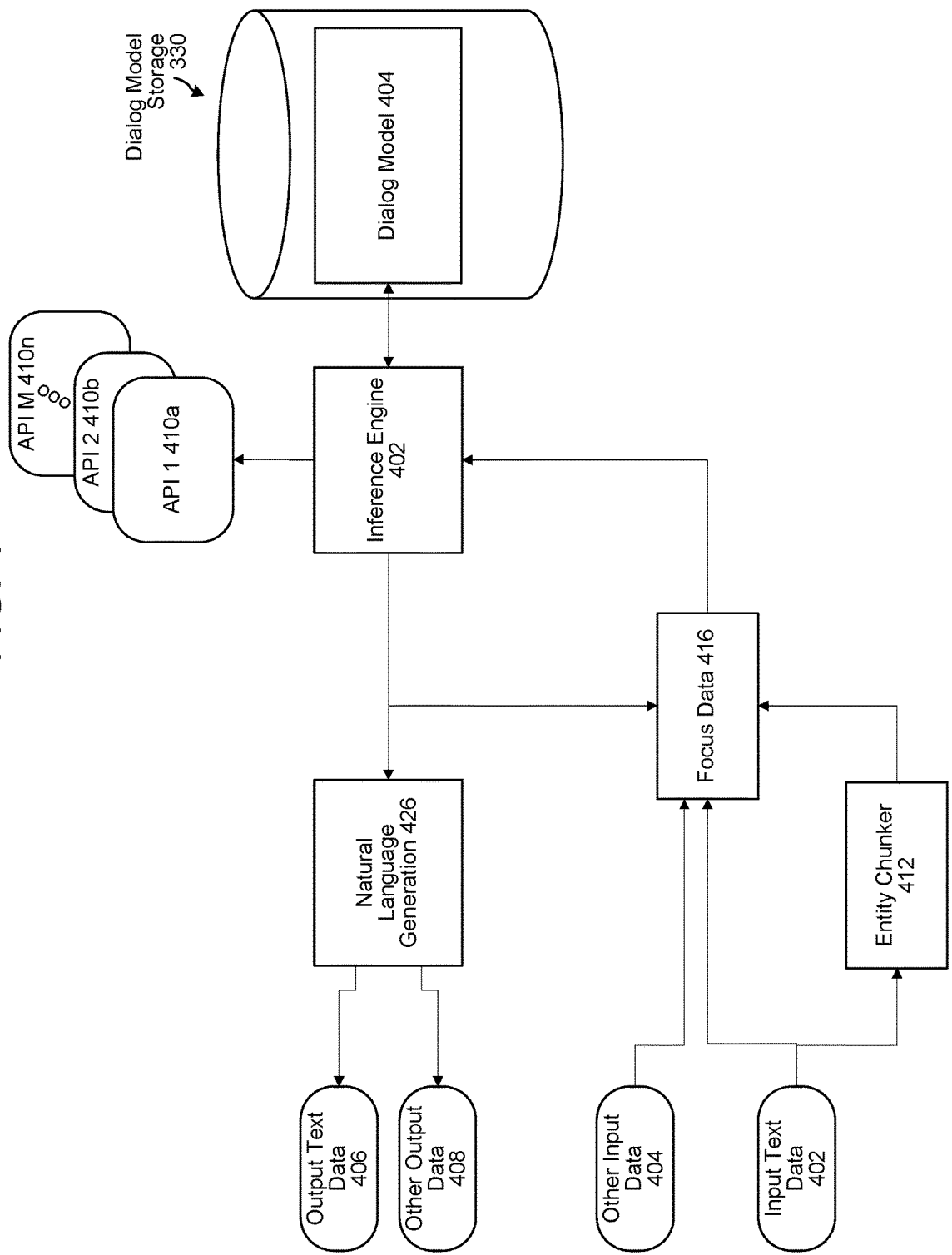
FIG. 4 a system for managing between states using a dialog model according to embodiments of the present disclosure.

FIG. 4 illustrates another embodiment according to the present disclosure. With reference also to the system of FIG. 6, the system generates output text data 406 and/or other output data 408 from input text data 302 and/or other input data 304. An entity chunker 312 may be used to determine entities in the input text data 402, and dialog focus data 416 may be stored therefrom. In these embodiments, an inference engine 402 is used to generate scores for one or more outputs of a single dialog model 404; the inference engine 402 may be a trained model, such as a classifier, and the scores may correspond to a similarity or correlation between outputs of the dial model 404 to the dialog focus data 416. The inference engine 402 may select one or more outputs having the highest score(s) and call a corresponding API 410 and/or send the output to the natural language generator 426. The inference engine 402 may include a dialog model predictor, such as the dialog model predictor 320, an action selector, such as the action selector 318, and one or more dialog models, such as the dialog model 314. In some embodiments, the inference engine 402 includes a dynamic computation graph for reading data from the dialog focus 416.

Figure 5A:
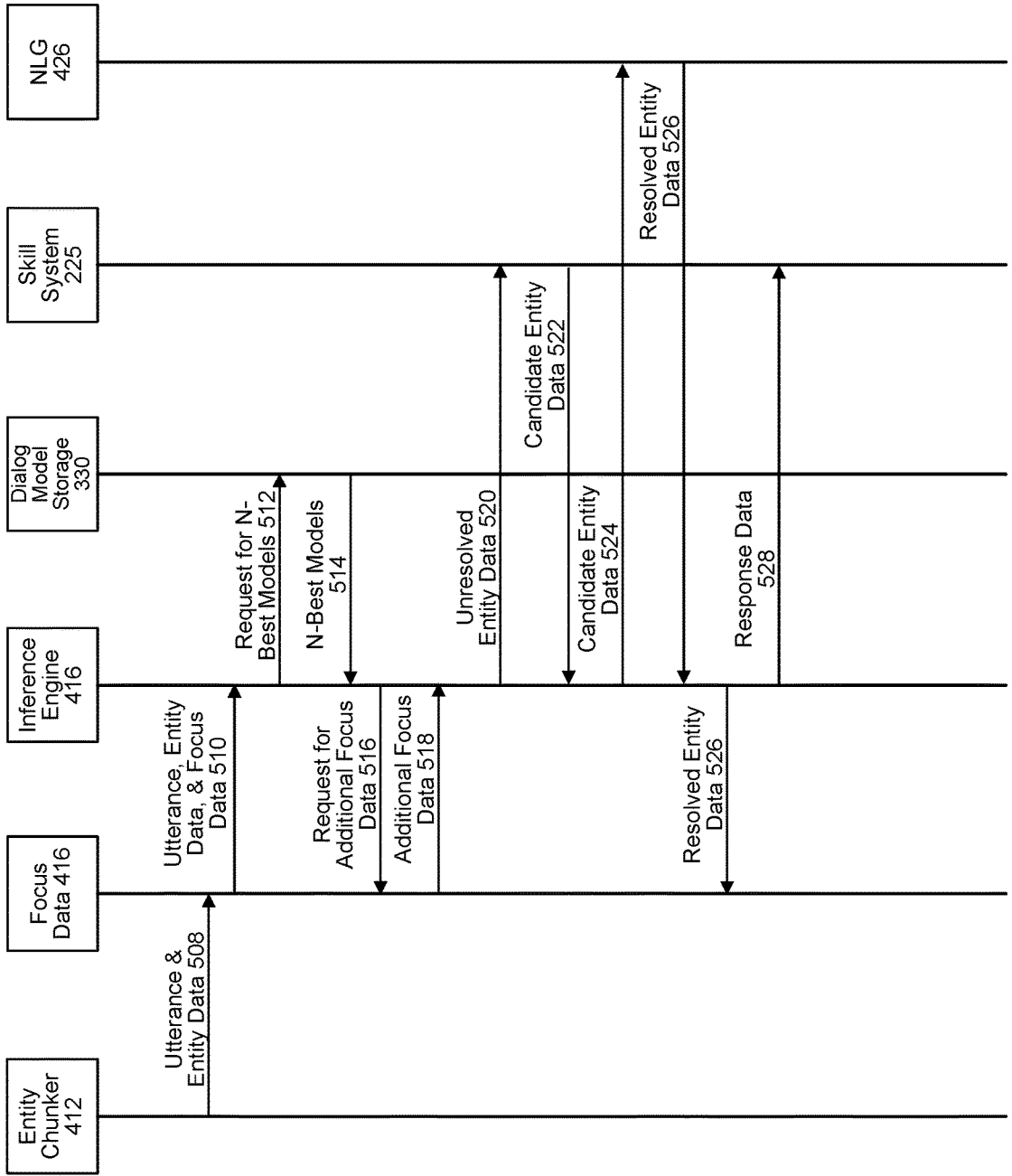
FIGS. 5A and 5B are process flow diagrams for managing goal-oriented dialog using multiple dialog models according to embodiments of the present disclosure.
Figure 5B:
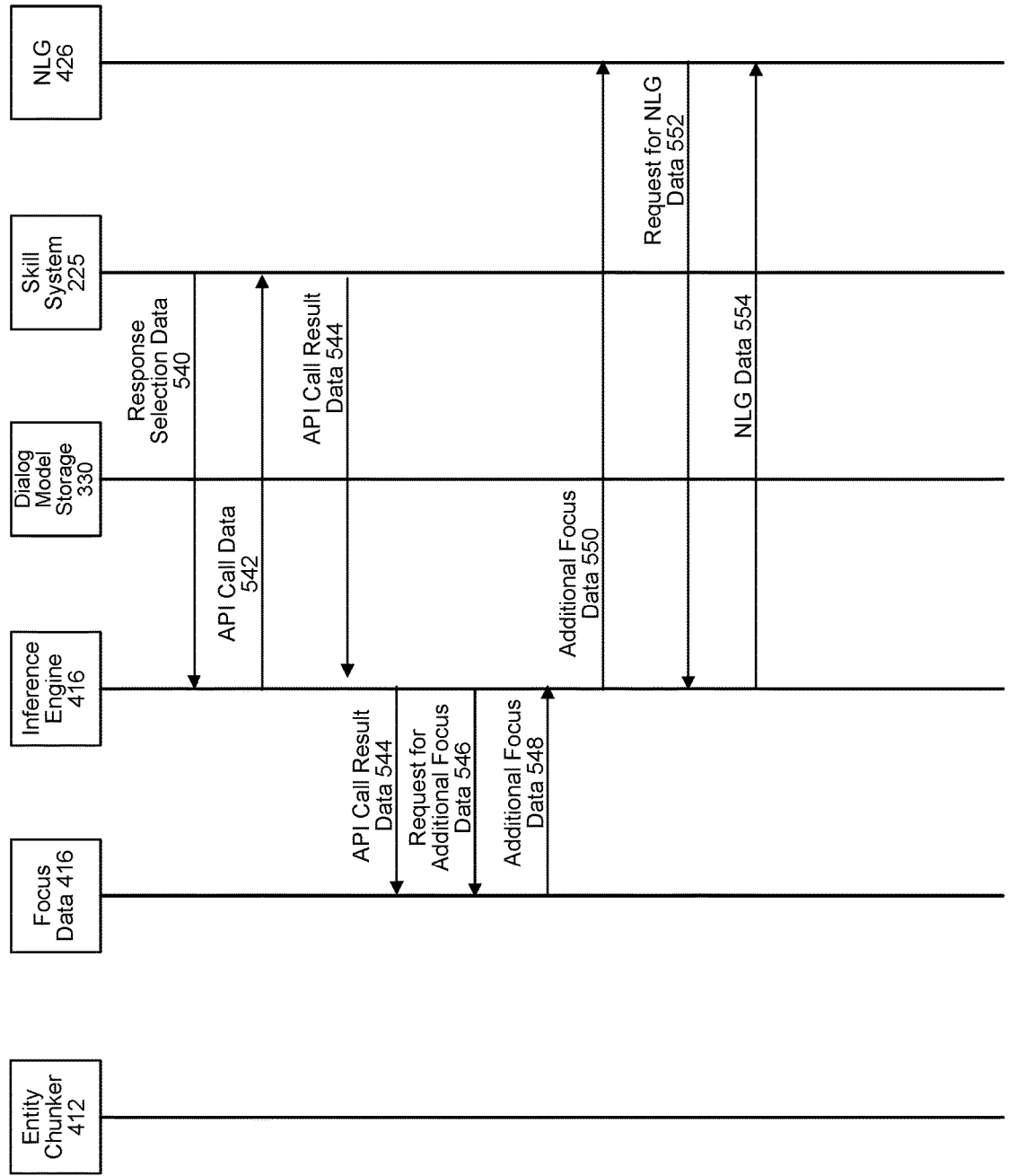

FIGS. 5A and 5B are process flow diagrams for managing goal-oriented dialog using multiple dialog models according to embodiments of the present disclosure. With reference first to FIG. 5A (and FIG. 4A), the entity chunker 412 sends entity data 508 and/or utterance data to the focus data 416, which may update the focus data to include the utterance and/or entity data. The focus data 416 may further send data 510 including the utterance, entity data, and focus data to the inference engine 416. Based on this data, the inference engine determines and sends a request for N-best models 512 to one or more dialog models in dialog model storage 330. As described herein, the N-best list may include one or more dialog models. The dialog models 330 returns, to the inference engine 416, the N-best models 514.

The inference engine 416 may send, to the focus data 416, a request for additional focus data 516 based at least in part on the N-best list 514, and the focus data 416 may send the additional focus data 518 to the inference engine 518. The inference engine 416 may send, to a skill system 225, any remaining unresolved entities in the form of unresolved entity data 520. The skill system 225 may be a speech agent system such as Alexa. The skill system 225 may process the unresolved entity data 520 and, using the techniques described herein, return a list of candidate entities in the form of candidate entity data 522. The inference engine 516 may send, to the skill system 225, the candidate entity data 524. The skill system 225 may be, for example, a database of contact information for a user account and may resolve an ambiguous name in the candidate entity data 522 by, for example, resolving names in the contact information. The skill system 225 may send, to the inference engine, resolved candidate data 526, which the inference engine may send to the focus data 416. The inference engine may determine response data 528 based at least in part on one of a plurality of candidate responses determined by the dialog models 330 and send the response data 528 to the speech system to cause a corresponding action (e.g., a speech output and/or API call).

Referring now to FIG. 5B, the speech system may determine and send, to the inference engine 416, response selection data 540, which may include data indicating an API call. The inference engine 416 may send, to the skill system 225, the API call data 542; the skill system 225 may execute a function associated with the API call data 542 and may send, to the inference engine, API call result data 544 corresponding to an output of the function; the inference engine 416 may forward the API call result data 544 to the focus data 416. The inference engine 416 may send, to the focus data 416, a request for additional focus data 546, and the focus data 416 may send, to the inference engine 416, the additional focus data 548. The additional focus data 548 may include data corresponding to output speech; the inference engine 416 may thus send, to the NLG component 426, the additional focus data 550, and the NLG component 426 may output speech based thereon. In some embodiments, the NLG component 426 sends, to the inference engine, a request for NLG data 554, which may include data corresponding to a template or style of speech; the inference engine 416 may thus send, to the NLG component 426, the NLG data. FIG. 6 is an illustrative block diagram of a natural language generation system according to embodiments of the present disclosure. The natural language generation system may be a trained model, such as a neural network, which is described in greater detail with reference to FIGS. 6 and 7. The natural language generation ("NLG") system, in some embodiments, generates output text data 306 from dialog outline data 602 such that the output text data 306 has a natural feel and, in some embodiments, includes words and/or phrases specifically formatted for a requesting individual. As opposed to using templates to formulate responses, the NLG system may include models trained from the various templates for forming the output text data 306. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history 604, a level or formality 606, and/or a command history 608.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using a text-to-speech system.

Figure 7:
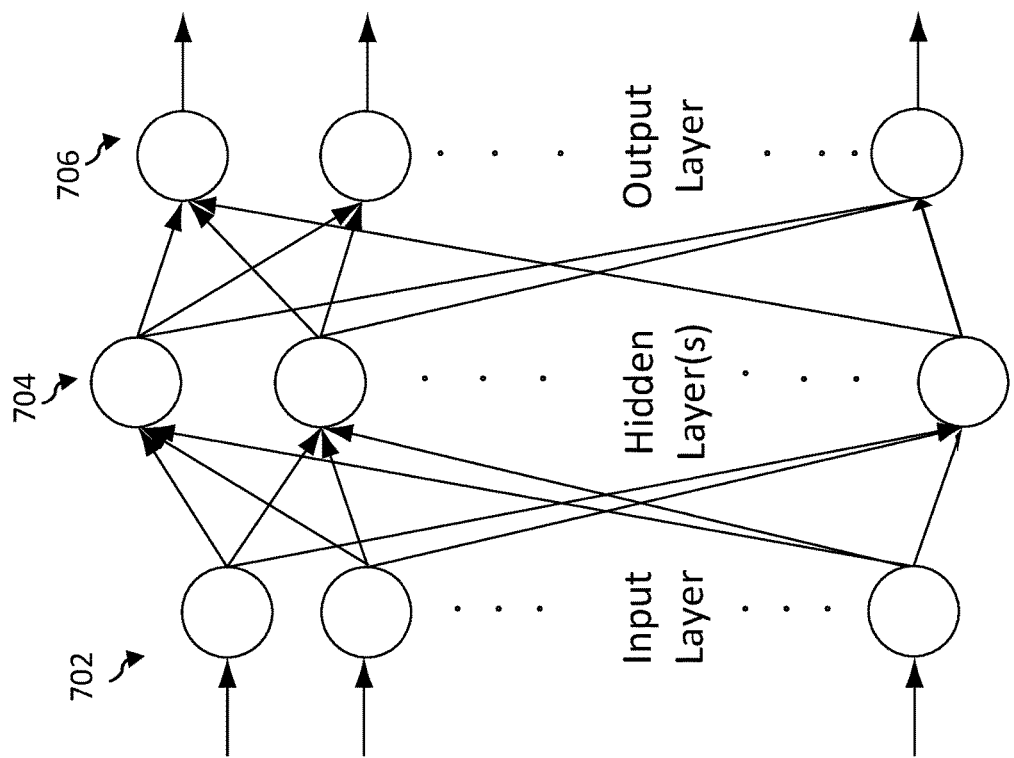
FIG. 7 illustrates a neural network for dialog processing according to embodiments of the present disclosure.

Neural networks may be used to perform dialog processing, including translation-model processing and language-model processing. An example neural network is illustrated in FIG. 7. The neural network may include nodes organized as an input layer 702, a hidden layer 704, and an output layer 706. The input layer 702 may include m nodes, the hidden layer 704 n nodes, and the output layer 706 o nodes, where m, n, and o may be any numbers and may represent the same or different numbers of nodes for each layer. Nodes of the input layer 702 may receive inputs, and nodes of the output layer 706 may produce outputs. Each node of the hidden layer 704 may be connected to one or more nodes in the input layer 702 and one or more nodes in the output layer 704. Although the neural network illustrated in FIG. 7 includes a single hidden layer 704, other neural network may include multiple middle layers 704; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

Figure 8:
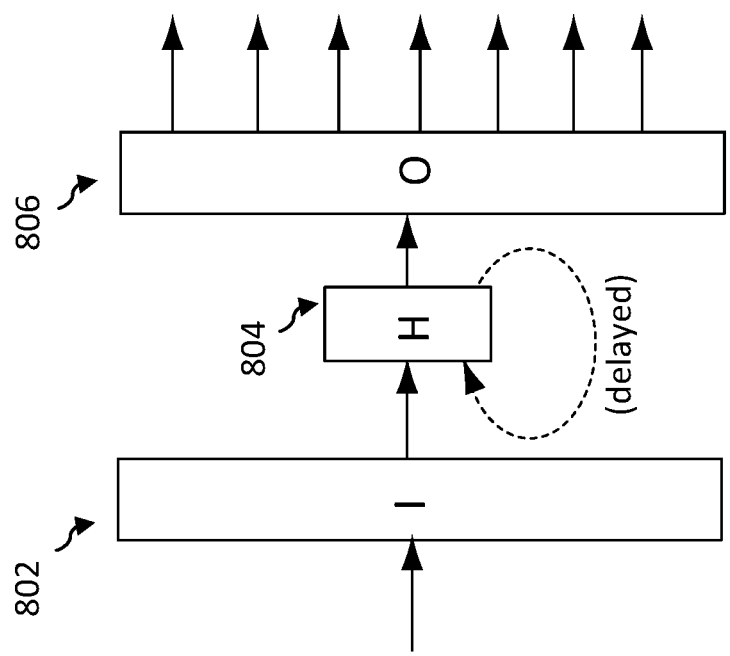
FIG. 8 illustrates a recurrent neural network for dialog processing according to embodiments of the present disclosure.

In one aspect, a neural network is constructed using recurrent connections such that one or more outputs of the hidden layer of the network feeds back into the hidden layer again as a next set of inputs. Such a neural network is illustrated in FIG. 8. Each node of the input layer 802 connects to each node of the hidden layer 804; each node of the hidden layer 804 connects to each node of the output layer 806. As illustrated, one or more outputs 808 of the hidden layer 804 is fed back into the hidden layer 804 for processing of the next set of inputs. A neural network incorporating recurrent connections may be referred to as a recurrent neural network (RNN).

In the case in which a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 8, the prediction of the potential next word may be based on previous words in an utterance and not just on the most recent word. The language model neural network may also output weighted predictions for the next word.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 9:
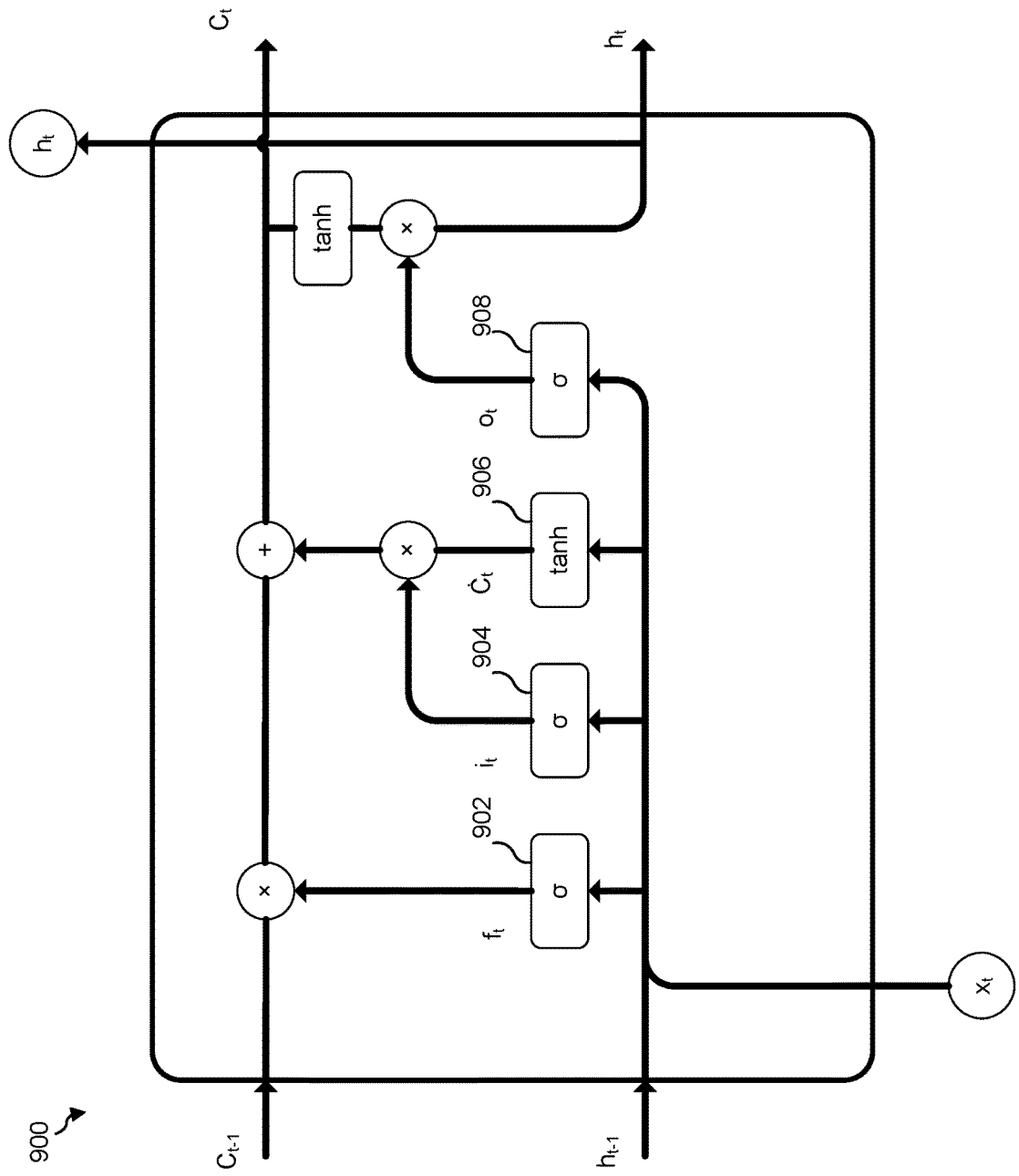
FIG. 9 illustrates a long-short-term memory cell for dialog processing according to embodiments of the present disclosure.

FIG. 9 illustrates an exemplary long short-term memory (LSTM) cell 900 capable of learning long-term dependencies. The LSTM cell 900 may be incorporated in, for example, the encoders 1002a, 1002b and/or decoders 1004a, 1004b of FIG. 10. The LSTM cell 900 receives an input vector $x_t$ and generates an output vector $h_t$. If the LSTM cell 900 is part of an encoder or translation model, the input vector $x_t$ corresponds to user input, such as input text data 910 of FIG. 10 or input data 702 of FIG. 7; the output vector $h_t$ corresponds to a context vector, such as the context vector 1012 of FIG. 10. If the LSTM cell 900 is part of a decoder or language model, the input vector $x_t$ corresponds to a context vector, such as the context vector 1012 of FIG. 10, and the output vector $h_t$ corresponds to dialog output, such as output text data of FIG. 10.

The cell further maintains a cell state $C_t$ that is updated given the input $x_t$, a previous cell state $C_{t-1}$, and a previous output $h_{t-1}$. Using the previous state and input, a particular cell may take as input not only new data ($x_t$) but may also consider data ($C_{t-1}$ and $h_{t-1}$) corresponding to the previous cell. The output $h_t$ and new cell state $C_t$ are created in accordance with a number of neural network operations or "layers," such as a "forget gate" layer 902, an "input gate" layer 904, a tan h layer 906, and a sigmoid layer 908.

The forget gate layer 902 may be used to remove information from the previous cell state $C_{t-1}$. The forget gate layer 902 receives the input $x_t$ and the previous output $h_{t-1}$ and outputs a number between 0 and 1 for each number in the cell state $C_{t-1}$. A number closer to 1 retains more information from the corresponding number in the cell state $C_{t-1}$, while a number closer to 0 retains less information from the corresponding number in the cell state $C_{t-1}$. The output $f_t$ of the forget gate layer 902 may be defined by the below equation.

$$f_t = \sigma\{W_f[(h_{t-1}),(x_t)] + b_f\} \quad (1)$$

The input gate layer 904 and the tan h layer 906 may be used to decide what new information should be stored in the cell state $C_{t-1}$. The input gate layer 904 determines which values are to be updated by generating a vector $i_t$ of numbers between 0 and 1 for information that should not and should be updated, respectively. The tan h layer 906 creates a vector $\dot{C}_t$ of new candidate values that might be added to the cell state $C_t$. The vectors $i_t$ and $\dot{C}_t$, defined below, may thereafter be combined and added to the combination of the previous state $C_{t-1}$ and the output $f_t$ of the forget gate layer 902 to create an update to the state $C_t$.

$$i_t = \sigma\{W_i \cdot [(h_{t-1}),(x_t)] + b_i\} \quad (2)$$

$$\dot{C}_t = \tan h\{W_C \cdot [(h_{t-1}),(x_t)] + b_c\} \quad (3)$$

Once the new cell state $C_t$ is determined, the sigmoid layer 908 may be used to select which parts of the cell state $C_t$ should be combined with the input $x_t$ to create the output $h_t$. The output $o_t$ of the sigmoid layer 908 and output $h_t$ may thus be defined by the below equations. These values may be further updated by sending them again through the cell 900 and/or through additional instances of the cell 900.

$$o_t = \sigma\{W_o \cdot [(h_{t-1}),(x_t)] + b_o\} \quad (4)$$

$$h_t = o_t \cdot [\tan h(C_t)] \quad (5)$$

Figure 10:
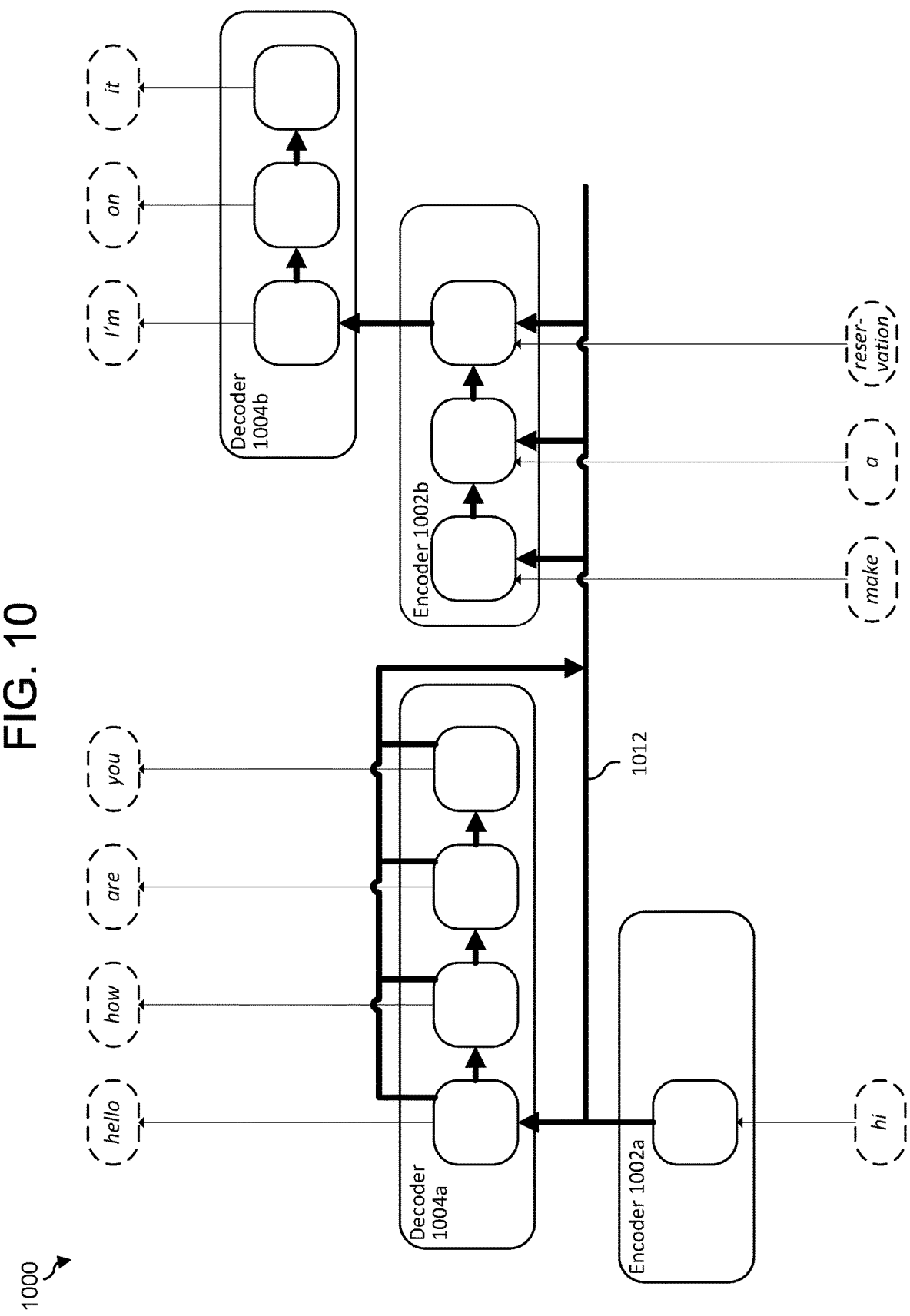
FIG. 10 illustrates a sequence-to-sequence model for processing steps of dialog according to embodiments of the present disclosure.

FIG. 10 illustrates a sequence-to-sequence model 1000 that includes encoders 1002a, 1002b and decoders 1004a, 1004b. A first turn t−1 of dialog is shown with a second turn t of dialog. The encoder 1002a and decoder 1004a used in the first turn may be re-used as the encoder 1002b and decoder 1004b in the second turn; that is, the outputs of the encoder 1002a and decoder 1004a in the first turn may be fed back to the same encoder 1002b and decoder 1004b in the second turn. Alternatively, the model 900 may be "unrolled" for each turn and use first instances of encoder 1002a and decoder 1004a in the first turn and second instances of encoder 1002b and decoder 1004b in the second turn. Though FIG. 10 illustrates only two turns, any number of turns may be unrolled. In some embodiments, the model 900 is unrolled into a number of instances during training, but fewer instances, including only one copy, are used in operation.

The encoder 1002a, 1002b and decoder 1004a, 1004b may be implemented using the LSTM cell 9900 of FIG. 9, other types of LSTM cells, other recurrent or convolutional structures, embedding layers, dense layers, or any other such neural-network layers or cells known in the art. In some embodiments, the encoder 1002a, 1002b includes embedding and LSTM layers, and the decoder 1004a, 1004b includes dense and LSTM layers. An embedding layer may include a transformer, such as a matrix multiplication, that transforms words into their corresponding vector formats or "embeddings." A dense or "fully connected" layer is a layer in which every input is connected to every output by a weight and which performs an operation on the input to the layer based on the weights. The sequence-to-sequence model 900 may be implemented using any computing language, using hardware and/or software, and on any computing system.

In the case in which the model 1000 is not unrolled, the encoder 1002a may be used, in a first turn, to encode an input sequence into a first vector 1012; this first vector 1012 may also or instead be known as a thought vector, context vector, or as any other fixed-dimensional, distributed representation. The first vector 1012 may be any single- or multi-dimensional set of values that reflects the words in the input text data. In one embodiment, the first vector 1012 is a one-dimensional vector of integers in which a given integer represents a corresponding word in the input sequence; the integer "38573" may represent the word "reservation," for example. The first vector 1012 may contain different representations for words, however, and may contain additional information, such as information regarding phrases, proper names, misspellings, number of turns, or any other information in the input text data or elsewhere.

The vector 1012 may then be used by the decoder 1004a to generate output text data. In a second turn, the encoder 1002b receives a second turn of input text data and creates a second vector. The decoder 1004b takes the second vector and generates output text data for the second turn. In this simple example, in a first turn, a user enters text "hi," and the model 1000 responds, "hello, how are you." In a second turn, the user enters text "make a reservation," and the model responds, "I'm on it." The response of the model (e.g., the output text data) is determined based on how the model is trained to respond to certain input text data. Possible variations in responses include but are not limited to the number of words of output in each turn, word selection for each position of output, sentence type (e.g., statement or question), or other such variations; the content of the output may include greeting the user, confirming receipt of information, prompting the user for further information, or other such content.

The relationships between the inputs, outputs, and state of the model 1000 may be defined by the below equations, in which the input text data is given by $X_t = x_1^t, x_2^t, \ldots x_L^t$ in turn t and the output text data to be generated is defined by $Y_t = y_1^t, y_2^t, \ldots t_{L'}^t$, in turn t, wherein L is the length of the input text data and L' is the length of the output text data. The encoder 1002a, 1002b determines $x_k^t$ from the raw input word at position k; in some embodiments, the encoder 1002a, 1002b includes an embedding layer to perform this function. A cell state vector $C_t = c_1^t, c_2^t, \ldots c_L^t$ denotes the cell state vector at word position k in turn t.

$$i_{k,enc}^t = \sigma\{W_{i,enc} \cdot [(h_{k-1,enc}^t),(x_k^t),(h_{L,dec}^{t-1}),(h_{L,enc}^{t-1})] + b_{i,enc}\} \quad (6)$$

$$f_{k,enc}^t = \sigma\{W_{f,enc} \cdot [(h_{k-1,enc}^t),(x_k^t),(h_{L,dec}^{t-1}),(h_{L,enc}^{t-1})] + b_{f,enc}\} \quad (7)$$

$$o_{k,enc}^t = \sigma\{W_{o,enc} \cdot [(h_{k-1,enc}^t),(x_k^t),(h_{L,dec}^{t-1}),(h_{L,enc}^{t-1})] + b_{o,enc}\} \quad (8)$$

$$\tilde{C}_{k,enc}^t = \tan h\{W_{C,enc} \cdot [(h_{k-1,enc}^t),(x_k^t),(h_{L,dec}^{t-1}),(h_{L,enc}^{t-1})] + b_{C,enc}\} \quad (9)$$

$$c_{k,enc}^t = f_{k,enc}^t \cdot c_{k-1,enc}^t + i_{k,enc}^t \cdot \tilde{C}_{k,enc}^t \quad (10)$$

$$h_{k,enc}^t = o_{k,enc}^t \cdot \tan h(c_k, enc) \quad (11)$$

In some embodiments, as shown in FIG. 10, the model 1000 is unrolled and the output of the encoder 1002a and/or the output of the decoder 1004a in the first turn are appended to the input of the encoder 1002b in a subsequent turn (in contrast to the embodiment described above). The output of each cell in the decoder, $h_t$, may thus computed as shown by the below equations.

$$i_{k,dec}^t = \sigma\{W_{i,dec} \cdot [(h_{k-1,dec}^t),(h_{L,enc}^t)] + b_{i,dec}\} \quad (12)$$

$$f_{k,dec}^t = \sigma\{W_{f,dec} \cdot [(h_{k-1,dec}^t),(h_{L,enc}^t)] + b_{f,dec}\} \quad (13)$$

$$o_{k,dec}^t = \sigma\{W_{o,dec} \cdot [(h_{k-1,dec}^t),(h_{L,enc}^t)] + b_{o,dec}\} \quad (14)$$

$$\tilde{C}_{k,dec}^t = \tan h\{W_{C,dec} \cdot [(h_{k-1,dec}^t),(h_{L,enc}^t)] + b_{C,dec}\} \quad (16)$$

$$c_{k,dec}^t = f_{k,dec}^t \cdot c_{k-1,dec}^t + i_{k,dec}^t \cdot \tilde{C}_{k,dec}^t \quad (17)$$

FIG. 11 illustrates a dialog model 1100, which may be one of the dialog models 314 of FIG. 3. The dialog model 10 may have a state tracker. The state tracker may be used instead of or in addition to other elements of the present disclosure. The dialog model 1100 includes features discussed elsewhere in the present disclosure, such as an encoder 1104 and a decoder 1106; the encoder 1104 may be used to encode dialog input 1108 into a context vector 1110, and the decoder 1106 may be used to generate dialog output data 1112 given the context vector 1110.

Other training techniques may be used with the model 1100 or other dialog systems described in the present disclosure. The model 1100 may be penalized when, for example, it selects an erroneous parameter for an API call. In a typical dialog session in a training corpus, a user and dialog system go through a number of turns of dialog before the dialog system learns the necessary information to make the request to the third-party device via the API. In some embodiments, however, the model 1100 is trained at each step of dialog with the final API call information, even if that information was unknown at that step of dialog. In other embodiments, if the user changes an earlier choice at a step in the dialog, the model is first trained with the API call information until the change occurs, then trained with the final API call information.

The model(s) discussed herein may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component may require establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
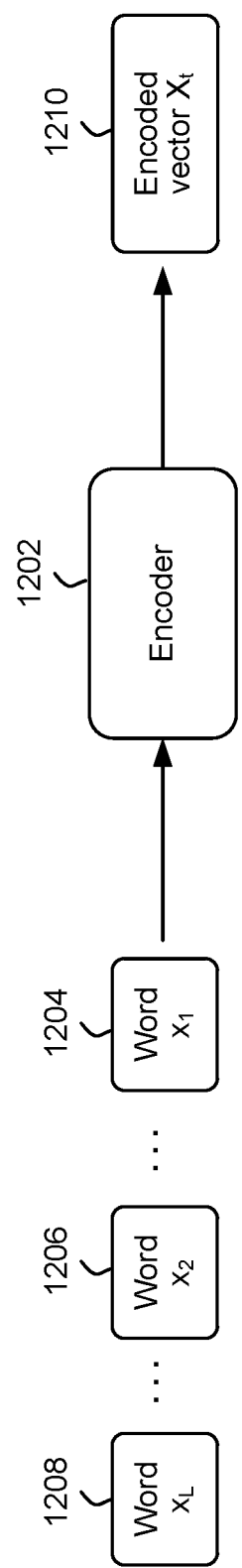
FIG. 12 illustrates operation of an encoder according to embodiments of the present disclosure.

FIG. 12 illustrates an encoder 1202. An input word sequence, starting with words $x_1$ 904 and $x_2$ 906 and continuing through words $x_L$ 908, is input into the encoder 1202; L is the length of the input word sequence in a given dialog turn. Given the input sequence 1204, 1206, 1208, the encoder 1202 projects this sequence to $X_t$ 1210, with $X_t$ being an F-dimensional vector. F may be a fixed length of the vector and may be configurable depending on the configuration of a particular dialog system. The value of F may be, for example, between 1 and 100, but any value may be used. The encoder 1202 may be configured to output vectors $X_t$ having the same size regardless of the size L of the input word sequence in a given turn, thus ensuring a continuity of output vector size. The output vector $X_t$ may also be referred to as an embedding of the sequence $x_1$, $x_2$, . . . $x_L$. The encoder 1202 may be implemented as a recurrent neural network (RNN) using, for example, LSTM cells, and may further use dense layers, embedding layers, or any other such layers.

Figure 13:
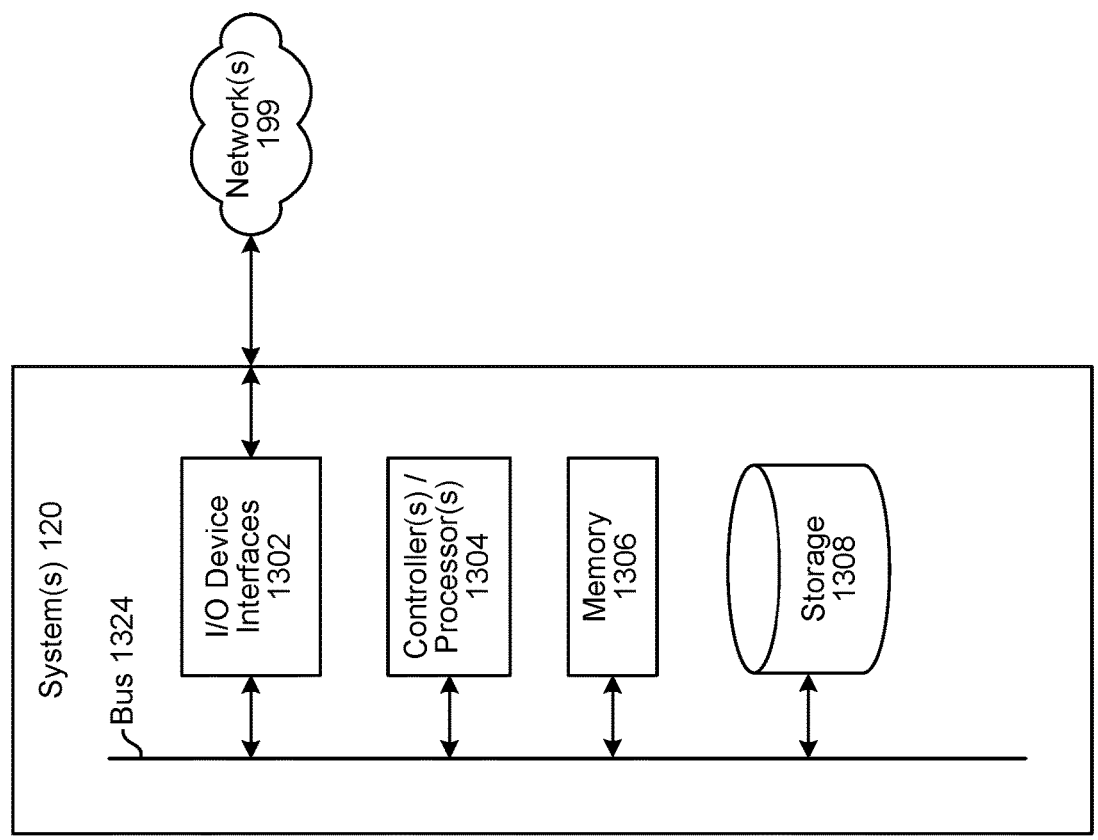
FIG. 13 is a block diagram conceptually illustrating example components of a server according to embodiments of the present disclosure.

FIG. 13 is a block diagram conceptually illustrating example components of a remote device, such as the system(s) 120, which may assist with ASR processing, NLU processing, etc., and a skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (120/225) may include one or more controllers/processors (1304), which may each include a central processing unit (CPU) for processing data and computer-readable instructions, and a memory (1306) for storing data and instructions of the respective device. The memories (1306) may individually include volatile random access memory (RAM), non-volatile read only memory (ROM), non-volatile magnetoresistive memory (MRAM), and/or other types of memory. Each device (120/225) may also include a data storage component (1308) for storing data and controller/processor-executable instructions. Each data storage component (1308) may individually include one or more non-volatile storage types such as magnetic storage, optical storage, solid-state storage, etc. Each device (120/225) may also be connected to removable or external non-volatile memory and/or storage (such as a removable memory card, memory key drive, networked storage, etc.) through respective input/output device interfaces (1302).

Computer instructions for operating each device (120/225) and its various components may be executed by the respective device's controller(s)/processor(s) (1304), using the memory (1306) as temporary "working" storage at runtime. A device's computer instructions may be stored in a non-transitory manner in non-volatile memory (1306), storage (1308), or an external device(s). Alternatively, some or all of the executable instructions may be embedded in hardware or firmware on the respective device in addition to or instead of software.

Each device (120/225) includes input/output device interfaces (1302). A variety of components may be connected through the input/output device interfaces (1302), as will be discussed further below. Additionally, each device (120/225) may include an address/data bus (1324) for conveying data among components of the respective device. Each component within a device (120/225) may also be directly connected to other components in addition to (or instead of) being connected to other components across the bus (1324).

Through the network(s) 199, the system may be distributed across a networked environment. The I/O device interfaces (1302) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1302), processor(s) (1304), memory (1306), and/or storage (1308) of the system(s) 120 or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 14:
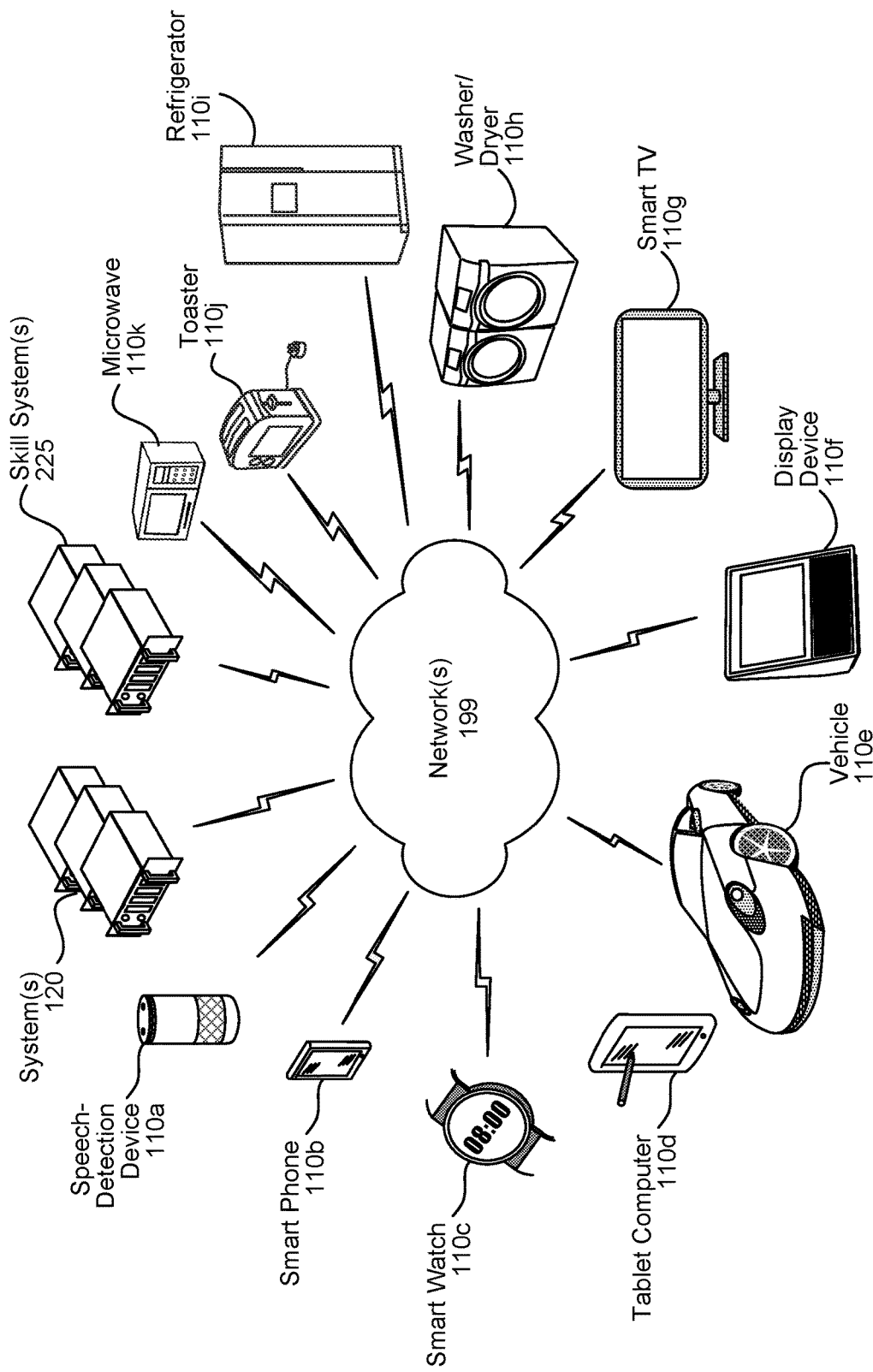
FIG. 14 illustrates an example of a computer network for use with the speech processing system.

As illustrated in FIG. 14, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. The components and process steps described herein may be interchangeable with other components or steps, or combinations of components or steps, and still achieve the benefits and advantages of the present disclosure. The disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first input data corresponding to a first request of a dialog, the first input data comprising natural language;
   determining the natural language includes an entity;
   determining dialog history data representing the dialog;

determining first dialog focus data including:
  the first input data,
  an indicator corresponding to the entity, and
  the dialog history data;
processing the first dialog focus data to determine:
  a first score representing a first relationship between the first dialog focus data and a first trained model corresponding to a first category of functions, and
  a second score representing a second relationship between the first dialog focus data and a second trained model corresponding to a second category of functions;
sending, based at least in part on the first score, the first dialog focus data to the first trained model;
sending, based at least in part on the second score, the first dialog focus data to the second trained model;
receiving, from the first trained model, first response data corresponding to a first potential response to the first request;
receiving, from the second trained model, second response data corresponding to a second potential response to the first request;
determining a third score representing a third relationship between the first input data and the first response data;
determining a fourth score representing a fourth relationship between the first input data and the second response data; and
performing, based at least in part on the third score and the fourth score, a first action associated with the first response data.

2. The computer-implemented method of claim 1, further comprising:
  sending the first dialog focus data to a third trained model corresponding to a third category of functions; and
  receiving, from the third trained model, third response data corresponding to an application programming interface (API) call.

3. The computer-implemented method of claim 1, further comprising:
  determining a user account corresponding to the first input data;
  determining user preference data corresponding to the user account;
  determining that the user preference data indicates a negative preference of a system associated with the second trained model; and
  determining the fourth score based at least in part on the negative preference.

4. A computer-implemented method comprising:
  receiving first input data corresponding to a first command of a dialog, the first input data comprising natural language;
  determining that the natural language includes an entity;
  determining dialog history data representing the dialog;
  determining first dialog focus data including:
    the first input data,
    a first indicator corresponding to the entity, and
    the dialog history data;
  processing the first dialog focus data to determine a first relationship between the first dialog focus data and a first model corresponding to a first category of functions;
  sending, based at least in part on the first relationship, the first dialog focus data to the first model;
  receiving, from the first model, first response data corresponding to a first potential response to the first command;
  processing the first dialog focus data to determine a second relationship between the first response data and a first goal represented in the first input data;
  determining, based at least in part on the second relationship, that a first action associated with the first response data is to be performed; and
  performing the first action.

5. The computer-implemented method of claim 4, further comprising:
  determining second dialog focus data including the first dialog focus data and a second indicator corresponding to the first action.

6. The computer-implemented method of claim 4, further comprising:
  processing the first dialog focus data to determine a third relationship between the first dialog focus data and a second model corresponding to a second category of functions;
  sending the first dialog focus data to the second model;
  receiving, from the second model, second response data corresponding to the first command;
  processing the first dialog focus data to determine a fourth relationship between the second response data and the first goal represented in the first input data; and
  determining the first action further based at least in part on the fourth relationship.

7. The computer-implemented method of claim 4, further comprising:
  receiving second input data corresponding to a second command of the dialog;
  determining second dialog focus data including at least the first dialog focus data and the second input data;
  sending the second dialog focus data to a second model; and
  receiving, from the second model, second response data corresponding to the second command.

8. The computer-implemented method of claim 4, further comprising:
  receiving first model data corresponding to the first model and an application programming interface (API);
  determining that the first model data corresponds to the entity; and
  determining the first relationship based at least in part on the first model data corresponding to the entity.

9. The computer-implemented method of claim 4, further comprising:
  determining second dialog focus data including at least the first dialog focus data and the first response data;
  receiving second input data corresponding to a second command of the dialog;
  sending the second dialog focus data to a second model; and
  receiving, from the second model, second response data corresponding to the second command.

10. The computer-implemented method of claim 4, further comprising:
  determining a first candidate domain corresponding to the first input data;
  determining a second candidate domain corresponding to the first input data; and
  determining that the first input data corresponds to the entity based at least in part on processing the first input data using:
    a first entity recognizer corresponding to the first candidate domain, and
    a second entity recognizer corresponding to the second candidate domain.

11. The computer-implemented method of claim 4, further comprising:
    determining a user account corresponding to the first input data;
    determining user preference data corresponding to the user account; and
    determining the first dialog focus data to further include the user preference data.

12. A system comprising:
    at least one processor; and
    at least one memory including instructions that, when executed by the at least one processor, cause the system to:
        receive first input data corresponding to a first command of a dialog, the first input data comprising natural language;
        determine that the natural language includes an entity;
        determine dialog history data representing the dialog;
        determine first dialog focus data including:
            the first input data,
            a first indicator corresponding to the entity, and
            the dialog history data;
        process the first dialog focus data to determine a first relationship between the first dialog focus data and a first model corresponding to a first category of functions;
        send, based at least in part on the first relationship, the first dialog focus data to a first model;
        receive, from the first model, first response data corresponding to a first potential response to the first command;
        process the first dialog focus data to determine a second relationship between the first response data and a first goal represented in the first input data;
        determine, based at least in part on the second relationship, that a first action associated with the first response data is to be performed; and
        perform the first action.

13. The system of claim 12, wherein the at least one memory further includes instructions that, when executed by the at least one processor, further cause the system to:
    determine second dialog focus data including the first dialog focus data and a second indicator corresponding to the first action.

14. The system of claim 12, wherein the at least one memory further includes instructions that, when executed by the at least one processor, further cause the system to:
    process the first dialog focus data to determine a third relationship between the first dialog focus data and a second model corresponding to a second category of functions;
    send the first dialog focus data to the second model;
    receive, from the second model, second response data corresponding to the first command;
    process the first dialog focus data to determine a fourth relationship between the second response data and the first a goal represented in the first input data; and
    determine the first action further based at least in part on the fourth relationship.

15. The system of claim 12, wherein the at least one memory further includes instructions that, when executed by the at least one processor, further cause the system to:
    receive second input data corresponding to a second command of the dialog;
    determine second dialog focus data including at least the first dialog focus data and the second input data;
    send the second dialog focus data to a second model; and
    receive, from the second model, second response data corresponding to the second command.

16. The system of claim 12, wherein the at least one memory further includes instructions that, when executed by the at least one processor, further cause the system to:
    receive first model data corresponding to the first model and an application programming interface (API);
    determine that the first model data corresponds to the entity; and
    determine the first relationship based at least in part on the first model data corresponding to the entity.

17. The system of claim 12, wherein the at least one memory further includes instructions that, when executed by the at least one processor, further cause the system to:
    determine second dialog focus data including at least the first dialog focus data and the first response data;
    receive second input data corresponding to a second command of the dialog;
    send the second dialog focus data to a second model; and
    receive, from the second model, second response data corresponding to the second command.

18. The system of claim 12, wherein the at least one memory further includes instructions that, when executed by the at least one processor, further cause the system to:
    determine a first candidate domain corresponding to the first input data;
    determine a second candidate domain corresponding to the first input data; and
    determine that the first input data corresponds to the entity based at least in part on processing the first input data using:
        a first entity recognizer corresponding to the first candidate domain, and
        a second entity recognizer corresponding to the second candidate domain.

19. The system of claim 12, wherein the at least one memory further includes instructions that, when executed by the at least one processor, further cause the system to:
    determine a user account corresponding to the first input data;
    determine user preference data corresponding to the user account; and
    determine the first dialog focus data to further include the user preference data.

20. The system of claim 12, wherein the first input data is automatic speech recognition (ASR) output data.

* * * * *